United States Patent [19]
Irsai

[11] 3,943,769
[45] Mar. 16, 1976

[54] ELECTRIC CONDUCTIVE LAMINATED VESSEL WALL

[76] Inventor: Eugene Irsai, 163 Greenway South, Forest Hills, N.Y. 11375

[22] Filed: Jan. 13, 1975

[21] Appl. No.: 540,586

[52] U.S. Cl. .................................. 73/401; 73/304 R
[51] Int. Cl.² ...................... G01F 23/00; G01L 7/18
[58] Field of Search ............ 73/401, 304 R; 200/189

[56] References Cited
UNITED STATES PATENTS
2,589,714    3/1952    Lee .................................. 73/304 R FOREIGN PATENTS OR APPLICATIONS
1,350,176   12/1963   France ............................. 73/304 R Primary Examiner—Donald O. Woodiel

[57] ABSTRACT

In a preferred embodiment of the invention, there is provided a laminated vessel wall which is able to enclose electrically conductive liquid with a know electrical property and which vessel laminated wall has alternate electric conductive and non-conductive layers of horizontally-lying whole-circumscribing frame elements lying one stacked on the other, the non-conductive layers being transparent for easier observation of the position of the liquid, and the position of the liquid within the enclosed vessel wall can be determined outside of the vessel wall by using the electrical conductivity of the electric-conductive layer which establishes a closed electrical circuit through the liquid and the vessel wall by directing conducted through a convenient outer measuring mechanism having a sliding contact contactable separate with each of the conductive layers, and this measurement of the position of the liquid being accomplished by the establishment of electrical circuit through the liquid, a conductive layer of the vessel wall and the outside measuring mechanism.

8 Claims, 6 Drawing Figures

ELECTRIC CONDUCTIVE LAMINATED VESSEL WALL

This invention is directed to a vessel for registering fluid pressure by liquid level along the wall of the vessel.

BACKGROUND OF THE INVENTION

Prior to the present invention, there have existed numerous techniques of measuring the position of the liquid in an enclosed vessel. One of the most common measuring devices in this category is the MERCURY MANOMETER in which the height of the mercury column is used to counterbalance a pressure of gaseous or liquid origin. The simplest manometer is transparent with glass or plastic wall of which the height of the mercury column can be determined by visual inspection thereof and comparing to calibrated height markings along the column, since the mercury column height determination gives the magnitude of the pressure. Some corrections were needed to account for the expansion of the liquid mercury due to variable temperatures and to account for the meniscus effect between mercury and the vessel wall of the column.

Another known method uses magnets placed at an upper face of the mercury within the column and the height position of the magnet can be determined from outside of the vessel wall by the conventional magnetic flux-dection.

Other known methods use photoelectric-cell and light combinations to determine the height of the upper surface of the mercury column as registered through a transparent wall. These prior methods all have some disadvantages with regard to the accuracy of the mercury column height measurements.

Visual reading of the mercury column is tedious and is characteristically inaccurate. Measurement of column height by the magnet magnetic flux position requires complicated and expensive electrical parts and labor, and accuracy of such readings are affected by factors such as temperature, wall thickness and the like. Photoelectric-cell measuring techniques for measuring mercury column height is also complicated and dependent on transparency of the vessels column wall, the accuracy and functioning of which is hampered by particles from the mercury forming a thin coating layer along the inner face of the column above intermittent upper surface levels of the mercury.

Mercury is the heaviest liquid that can be used for these measurements, but other liquids are sometimes used if the magnitude of the pressure to be measured is low and if a very high precision is needed, beyond the precision possible with mercury.

SUMMARY OF THE INVENTION DISCLOSURE

Objects of the invention include the overcoming of one or more of the difficulties and problems and disadvantages of the types discussed above.

Another object is to obtain a new much stronger wall which is able to withstand high pressures, especially adapted for measuring pressures greater than the magnitude and range of pressure possible by a mercury column apparatus which uses the prior method known as "BACKPRESSURE APPLICATION", which prior method embodies the application of a known counter-balancing pressure at one side of the mercury column and applies a somewhat higher pressure at the other side of the mercury column and the difference of the two pressures can be measured on the height of the mercury column of the manometer. In contrast, the conventional prior manometer walls have been unable to withstand elevated pressures at such magnitude. Correction of measured pressure measured by the backpressure method is a part of the measuring technique since the known pressure will change its volume and pressure during measurement according to the Boyle-Mariotte and other gas laws which also effect the measured pressure.

Another object is to obtain an advantage of an electrical signal source for measuring and controlling events of a system related to the pressure magnitudes, such as controlling the magnitude of the pressure with a high degree of precision by use of an electrical circuitry and measuring mechanism, such as a system requiring the opening or closing valves for the reducing or increasing of pressure by using a mercury column together with the novel device of this invention.

Other objects become apparent from the preceding and following objects.

One or more objects of the present invention are obtained by the invention as defined herein.

Broadly the invention includes an enclosed space-defining vessel having an upwardly-extending laminated wall which is built-up from stacked alternately-occuring horizontally-extending thin typically flat-faced layers of electrically conductive sheets separated from one-another by alternately-occurring similarly flat-faced thin layers of electrically non-conductive sheets. Within the enclosed space, when the liquid therein changes its height-level position due to any reason such as pressure and/or temperature, etc. The specially built laminated wall of stacked layers permits accurate measurement of the column height position of the liquid by electrical technique, by using the outside part of the wall for electrical monitoring the inside height position of the upper surface of liquid. This monitoring includes the preferred employment of a sliding contact of a variable switch for selective contact with a particular conductive layer and/or counting of the number of conducting layers and/or the length by any conventional calibrated element, which thereby obtains accurate measurement of the height position of the electrically-conductive liquid.

The invention further includes any equivalent mechanism for similar monitoring by electrical mechanism, including the use of elements such as direct wiring contacts for each conductive-layer sheet, and including the use of mechanisms and equipment for taking eletrical measurements of the discontinuity of the electrical circuit as effected and represented by the height position of the upper surface of the liquid, and the like.

The invention contemplates alternate use of any of all liquids, in an enclosed or partly enclosed vessel, with known liquid electric properties, including also even non-conductive liquids when a thin layer of conductive and light density liquid can produce the signal for electrical measurement of the liquid position.

A first liquid having a low electrical conductivity can be used within this invention by placing a thin layer of conductive second liquid above it where the conductive second liquid density is lower than that of the first liquid such that the second liquid on top of the first liquid; and electrical conductance through the second liquid gives indication of the position of the upper surface of the measuring first liquid by electrical indicator means receiving current through the electric conductive walls.

THE FIGURES

DETAILED DESCRIPTION OF THE INVENTION

Figures 1, 2:
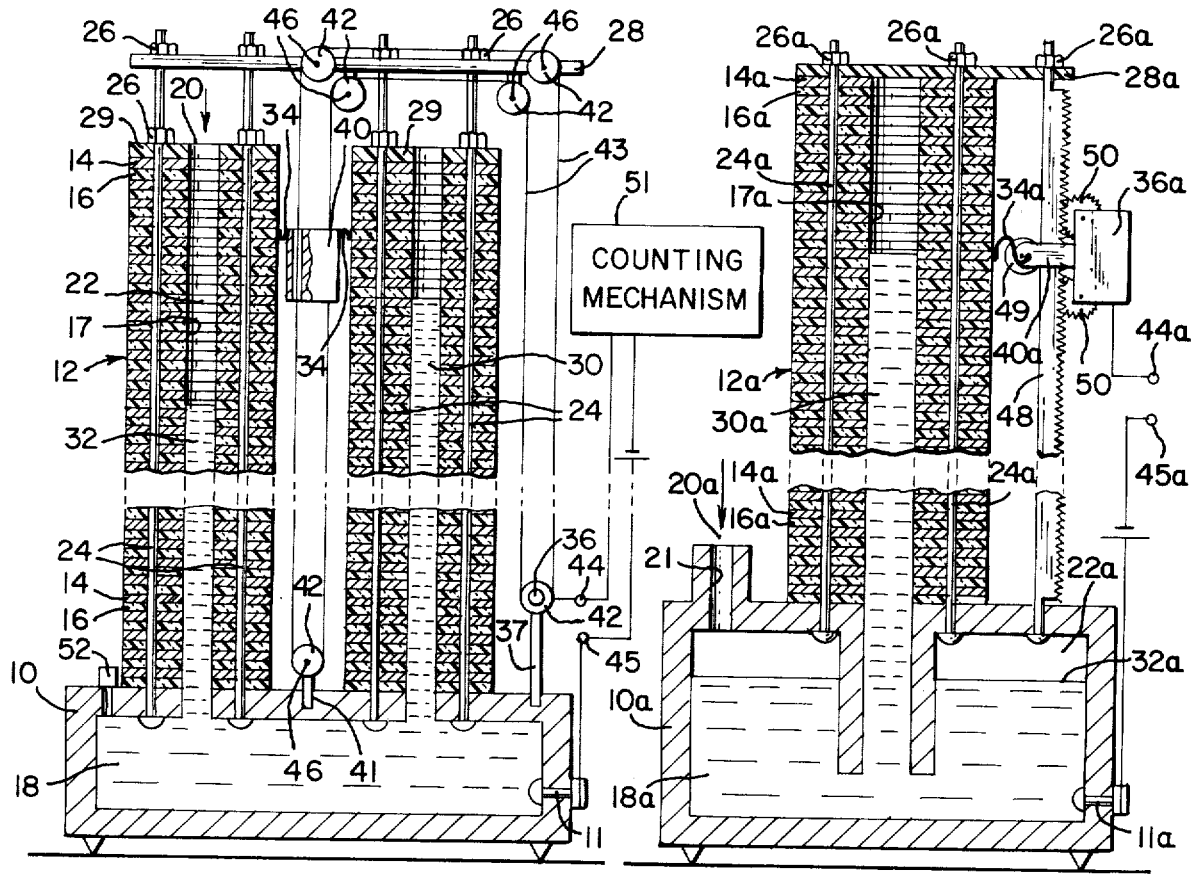
FIG. 1 illustrates a cross sectional side view of a first embodiment of the present invention designed in accord with basic design utilized for conventional U-shaped manometers, which inventive embodiment utilizes a known-density conductive liquid therein such as mercury.
FIG. 2 illustrates an alternate second other embodiment in side cross-sectional view of the design typical of a single-tube manometer of the type where pressure is applied at the top of a surface of the liquid therein to cause liquid to rise in the single-tube.
Figures 3, 4, 5, 6:
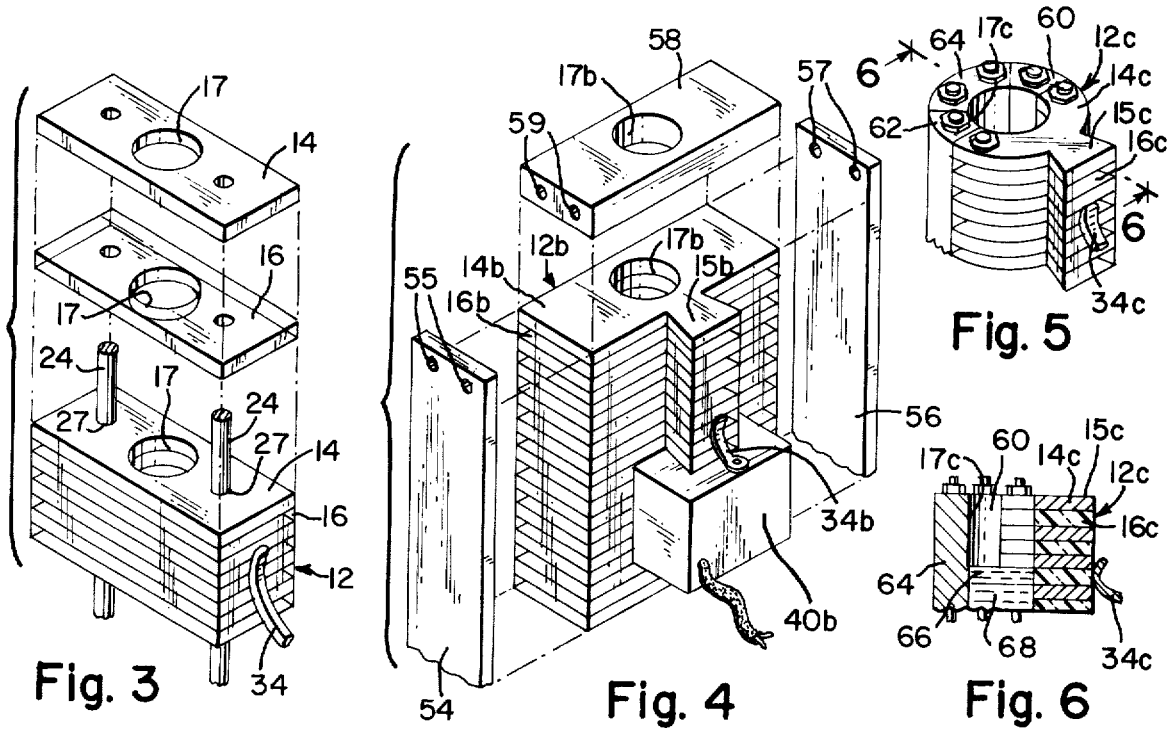
FIG. 3 illustrates an in-part front-side-top perspective in-part exploded view of stacked alternate electrically conductive and electrically non-conductive vessel column-forming layers of the manometer first embodiment of FIG. 1.
FIG. 4 illustrates a third still other alternate embodiment of the present invention in partial-exploded view thereof for an in-part view of this embodiment in frontside top respective view.
FIG. 5 illustrates a fourth still other embodiment in an in-part view in side-top perspective.
FIG. 6 illustrates a cross-sectional side view of the embodiment of FIG. 5 as taken along lines 6—6 thereof.

In greater detail, the embodiment of FIG. 1 embodies a manometer columnar wall built-in by laminated layers of thin sheets stacked one upon top of the other which are alternately electrically conductive and electrically non-conductive sheets held together by anchoring bolt rods and nuts on each of opposite sides of the liquid flow base defined through the center of each of the conductive and non-conductive sheets or plates. In this embodiment, the pressure to be measured is applied at one side as indicated where the arrow symbol indicates pointed in a downward direction, and the height of the liquid 30 rises as a result of such downward pressure, the rising of the liquid 30 being in the other side counter-balancing column such that the weight of the liquid 30 counter balances the downward pressure, this column of this particular embodiment being open to the atmosphere. Represented merely as a typical type which may be employed, a contact switch measures the electrical current pass in circuit through the electrically conductive metal sheet or plate through the outside portion thereof as a sliding contact of flexible nature such that the movable contact switch may be moved to search-out and locate the liquid upper surface by determining the discontinuity of electrical circuit through the consecutive alternate electrically conductive sheets or plates. The details of this embodiment are further shown in the respective exploded in-part view of FIG. 3, showing the separate nature of the interspersed non-conductive and conductive alternating sheets, as well as symbolically showing in an in-part view the contact switch variably movable along the other surface of the columnar wall of laminated conductive and non-conductive sheets or plates. It is to be noted that the securing elongated bolts are composed of non-conductive material or alternately include a coating or insulation of non-conductive material to prevent the passing of current between consecutive plates by directions other than by the liquid as a conductor medium.

FIG. 2 in contrast thereto illustrates a single-tube manometer of the present invention where the pressure is applied at the top of the liquid in the bottom container and causes the liquid to rise within the laminated columnar wall such that electrical circuit is closed through the conductive layer of the conductive sheet with which the electrical contact switch registers along the outer surface when the liquid is at its height corresponding to the inner end contact surface of the plate for contact therewith the liquid. This particular embodiment of FIG. 2, as contrasted to the pulley-system of the FIG. 1 embodiment, utilizes a toothed-bar arrangement along with the variable position contact switch rise upwardly and downwardly controllably.

For the present invention electrical flow from the variable switch may be conventional wiring as for example is illustrated for FIG. 2, but also may advantageously being a part of the cord pulley system as illustrated in the embodiment of the FIG. 1.

In the FIG. 4 third embodiment it is illustrated that the alternate layers of electrically conductive sheets and the interspersed non-conductive sheets are held together by force exerted by interlocked size and top plates securely anchored (not shown) to the bottom vessel portion by any of desired and/or conventional means.

FIGS. 5 and 6 differs from the prior embodiment in that for a single column in which the liquid rises upon the application of downward pressure on the liquid within the vessel therebelow, the column is composed of the alternate plates, and inter-spersed non-conductive layers fixed in only partially around the liquid containing space, separated by insulating wall section from an electrically-conductive wall section extending upwardly along its longitudinal axis to transverse varying levels of a liquid upper surface such that irrespective as to the height of the mercury or other liquid within the space, the liquid is always in contact therewith for electrical conductive through the liquid to the conductive plates in contact with the liquid.

In greater detail, FIGS. 1 and 2 illustrate preferred embodiments of the invention in the form of a conventional mercury manometers. In particular, these general types of manometers consist of a bottom container 10 and 10a, and typically vertical walls 12, 12' and 12a which by this invention are laminated by the alternate layers of electrically conductive and non-conductive sheets 14 and 14a and 16 and 16a, and the mercury 18 and 18a is placed within, shown within the columnar spaces as column mercury 30 and 30a. The pressure is applied at one side of the FIG. 1 U-shaped manometer at 20 or at the top FIG. 2 of the single column's embodiment mercury surface at 20a where the compressed gas or fluid 20 and 20a respectively above the mercury 18 and 18a. The compacted stack of sheets are held together by bolts 24 and 24a and nuts 26 and 26a and a frame 28 and 28a suitable to make a firm structure. FIG. 3 shows some perspective view details of the FIG. 1 embodiment, better illustrating relative positions of various elements. After applying the pressure at the points marked by arrows at points 20 and 20a the mercury 18 and 18a will rise as columnar mercury 30 and 30a as upper mercury surface 32 and 32a are forced downwardly. The magnitude of the applied pressure at points 20 and 20a can be calculated by knowing the difference of the height between the two columns of the FIG. 1 embodiment and by knowing the density of the liquid. Some corrections are calculated and made due to the temperature, atmospheric pressure, meniscus liquid effects and the like. The simplest type of the conventional manometer is open to the atmospheric pressure at the side other than the pressure application.

However the atmospheric pressure can be replaced by a known pressure as in the FIG. 2 embodiment and the measurements are made over that pressure in the range of the manometer. The lamination-reinforced walls 12 and 12d permit the measurement of much greater pressures than the prior manometer's which are measurable at walls.

The height of the upper surfaces of mercury columns 30 and 30a can be seen through non-conductive transparent sheets 16 and 16a alternately spaced between electrically-conductive sheets 14 and 14a.

The height of the upper surfaces of the columns are determined electrically when a low current electrical potential such as 3 to 10 volts is placed to make an electrical circuit between the bottom containers 10 and 10a and the conductive sheets 14 and 14a at the top of the mercury column where the sliding contacts 34 and 34a is moved upwardly and downwardly by hand turning of a knob 36 in the FIG. 1 embodiment or by a small electric motor 36a in the FIG. 2 embodiment moving up and down.

The FIG. 1 knob 36 is connected to the sliding contact car 40 by small wheels 42 and wiring mechanism 43 which allows the hand turning force on knob 36 to the change of the position of the sliding switch contact car. The wheels 40 and 42 are supporting the wire mechanism 43 and wheels 40 and 42 are mounted on the frame of the manometer at points 46. Plates 28 and 29 are parts of the manometer frame.

The sliding contacts 34 and 34a can indicate the presence of the electrical circuit through conductive sheets up to the height of mercury columns 30 and 30a, and there will be a point above the upper surfaces of columns 30 and 30a at which no circuit can be established and is the indicative of the top of the mercury column 30 and 30a. The thinner the laminated sheets 14 and 16 are the more accurate the determination of the mercury column's height can be. The motorized small variable switch car 36a moves to and fro upwardly and downwardly on bar 48 and the car is secured by wheels 49 and 50 and make the possible movement vertically. The motor of variable switch car 36a can be manually or automatically triggered by the electrical circuit to move the switch car 36a up as far as the circuit is disconnected when it stops. Both sliding contacts 34 and 34a can be connected to a conventional counting mechanism as mechanism 51 of FIG. 1 which typically would show the height of the column 30 directly converted to pressure.

Openings 52 of FIG. 1 symbolizes a deairing outlet of the U-shape manometer.

FIG. 3 illustrates the details of the laminated sheets 14 and 16 of FIG. 1 which are alternately conductive and non-conductive and are held together by bolts 24 and nuts 25 which are sealed against upper and lower faces of the laminated walls 12. The sliding contact 34 illustrates one of the many methods that can be used to make observation of the electrical circuit outside of the wall.

FIG. 4 illustrates a third version in-partial exploded view in which bolts of prior Figures are not used to hold the laminated wall together but where the securing pressure is exerted by the side and top plates to make a sturdy and secure structure. FIG. 4 illustrates the laminated electrically-conductive and non-conductive sheets 14b and 16b respectively, with somewhat different shape having projection 15b which serves as a track on which the sliding contact car 40b with its contact 34b can move to and fro upwardly and downwardly, utilizing friction for grasping against the uneven surface of the wall. Plates 54, 56 and 58 represent the plates at the sides and at the top.

The FIGS. 5 and 6 embodiment, like the FIG. 4 embodiment, includes a flange projection 15c on which a variable switch (not illustrated) is slidably secured as in the FIG. 4 embodiment. This embodiment has alternately stacked electrically-conductive and non-conductive plates 14c and 16c separated from conductor wall section 64 by electrically insulating wall sections 60 and 62. However in the column space separating the conductive sheets 14 and conductor 64, as shown in FIG. 6, is low specific gravity conductor liquid 66 floating on an electrically non-conductive liquid 68, circuit being closable by the contact of conductor liquid with conductor 64 and a sheet 14c when contact 34 is thereagainst, at the top of the height of the column of liquids 68 and 66. FIG. 6 utilizes bolt holes and bolts in each of 60, 64 and 62 and 14c to secure-together the structure.

The uses of the inventive structures of the present invention are many and various, the preceding illustrated embodiments being merely a preferred area of technological use of great utility known to the inventor.

Accordingly, it is within the scope of the invention to make such variations and/or substitution of equivalents as would be apparent to a person of ordinary skill.

I claim:

1. A liquid level indicating device comprising in combination: a container vessel substantially enclosable of and containable of a liquid, the container vessel having at least one substantially uprightly extending wall including a series of electrical contacts separate from one-another arranged serially substantially uprightly along an inner surface of the wall, each electrical contact having an electrical lead extending exteriorly of the vessel and of said wall separate from leads of others of the series of electrical contacts, a vessel electrical terminal means for providing electric current to liquid within the vessel such that electricity is conductable therefrom through an upper portion of the liquid into one of said series of contacts in intimate electrically conducting contact with the upper portion of the liquid, electrical power means for providing electricity connected operatively to said vessel electrical terminal means, and a multiple-contact variable selector switch means mounted for intermittent connection in circuit serially electrically through said electrical power means and one of said electrical contacts in the liquid for said series of electrical contacts selectively such that a height of liquid within said container vessel is determinable by observance of which of a higher of said series is conductable of current therethrough and through the respective lead thereof, said upright wall comprising a series of alternate layers of conductive elements and non-conductive elements with the non-conductive elements electrically isolating alternate ones of the conductive elements from one-another, the electrically conductive elements being said series of electrical contacts at inner ends thereof.

2. A liquid level indicating device of claim 1, and an electrically conductive liquid contained within said container vessel.

3. A liquid level indicating device of claim 3, and a non-conductive liquid within said container vessel, said non-conductive liquid being of a specific gravity more that specific gravity of said electrically conductive liquid.

4. A liquid level indicating device of claim 2, and a conduit conductable of fluid under pressure, extending within said vessel structure and intimate therewith to a point sufficient to effect isolated fluid contact with an isolated upper surface below said liquid such that fluid pressure applied through the conduit onto the isolated upper surface will cause a rise in liquid level of liquid within said container vessel along said upright wall thereof at locations exterior to the conduit, to function as a manometer.

5. A liquid level indicating device of claim 4, in which said container vessel is a closed vessel such that fluid within the enclosed container vessel above the liquids upper face is compressible by and upon rise of the liquid within the container vessel.

6. A liquid level indicating device of claim 4, in which said conduit comprises a separate series of alternate layers one on top of the other of electrically conductive elements and non-conductive elements spaced therebetween isolating alternate ones of the electrically conductive elements of the separate series.

7. A liquid level indicating device of claim 2, in which said series of alternate layers defines a section extending uprightly as a fractional part of inner and outer surfaces of said upright wall, and in which remaining sections extending uprightly as remaining fractional parts of inner and outer surfaces of said upright wall includes a conductor element operatively connected in electrical series for conducting electricity when in contact with said liquid and insulating means for electrically isolating said conductor element from said layers of conductive elements, such that electrical flow is affectable by circuit completion through said liquid when the liquid is at a height sufficient to be in electrically conductive contact with each of said conductor element and at least one of said electrical contacts when circuit with said selector switch means is closed.

8. A liquid level indicating device of claim 1, in which said series of alternate layers defines a section extending uprightly as a fractional part of inner and outer surfaces of said upright wall, and in which remaining sections extending uprightly as remaining fractional parts of inner and outer surfaces of said upright wall includes a conductor element operatively connected in electrical series for conducting electricity when in contact with said liquid and insulating means for electrically isolating said conductor element from said layers of conductive elements, such that electrical flow is affectable by circuit completion through said liquid when the liquid is at a height sufficient to be in electrically conductive contact with each of said conductor element and at least one of said electrical contacts when circuit with said selector switch means is closed.

* * * * *